(12) United States Patent
Wackowski

(10) Patent No.: US 6,192,594 B1
(45) Date of Patent: Feb. 27, 2001

(54) FRACTION RULER

(75) Inventor: Sally L. Wackowski, Vernal, UT (US)

(73) Assignee: Extra Measures, Inc., Franklin Park, IL (US)

( * ) Notice: Subject to any disclaimer, the term of this patent is extended or adjusted under 35 U.S.C. 154(b) by 0 days.

(21) Appl. No.: 09/059,587

(22) Filed: Apr. 14, 1998

(51) Int. Cl.[7] .................. B43L 7/00; G01B 3/04
(52) U.S. Cl. ............. 33/494; 33/679.1; 434/196; 434/188
(58) Field of Search .............. 33/494, 483, 492, 33/481, 679.1; 434/188, 196; D10/70, 71

(56) References Cited

U.S. PATENT DOCUMENTS

| | | | |
|---|---|---|---|
| 356,167 | 1/1887 | Shannon | 434/196 |
| 679,599 | * 7/1901 | Cambell | 33/700 |
| 1,098,330 | 5/1914 | Pannenkowa . | |
| 1,174,689 | 3/1916 | Coleman | 434/196 |
| 1,356,987 | * 10/1920 | Ingle | 33/494 |
| 2,803,069 | 8/1957 | Struna . | |
| 3,204,344 | 9/1965 | McMeen | 434/196 |
| 3,781,114 | 12/1973 | Marsh et al. . | |
| 4,614,042 | 9/1986 | Maurer | 33/494 |
| 4,778,390 | 10/1988 | Marans | 434/187 |
| 5,470,234 | 11/1995 | Sher | 434/196 |

* cited by examiner

Primary Examiner—Christopher W. Fulton
(74) Attorney, Agent, or Firm—Laff, Whitesel & Saret

(57) ABSTRACT

An educational apparatus used for the teaching of mathematical operations that use fractions. A triangular shaped ruler prism has three different side surfaces that are joined together at three common edges with four different numerical value measuring fractional scales on each side surface and a whole unit scale of which all other scales are a fractional part thereof. All scales have the same length as the whole unit scale. Preferably on each prism side there are two different fractional measuring scales adjacent and aligned with each other in a straight line at one of the common joined prism edges. Fractional scale measuring units that have been used include; the whole unit, half units, thirds, fourths, fifths, sixths, sevenths, eights, ninths, tenths, elevenths and twelfths units. By stated procedures employing marking on a writing surface, fractions may be represented by lengths and added or subtracted from each other as well as mixed numbers with fractions. By using a unit square marking surface in conjunction with the triangular prism ruler multiplication or division may be performed with the ruler.

7 Claims, 2 Drawing Sheets

FRACTION RULER

BACKGROUND OF THE INVENTION

The use of teaching devices to teach and learn the concepts behind and mathematical operations involving fractions, mixed numbers and decimals are known. With some such devices the measurement of fractional lengths by the use of rulers of various kinds is employed.

The present invention relates to one such ruler wherein a triangular shaped prism with three faces has twelve scaled working edges. Four scaled working edges are located on each prism face with two such edges being adjacent each other along one of the prism's three edges. The length of the prism's edge is at least twice that of two of the adjacent scaled working edges, scaled numbers appear on different prism faces having a common prism edge and are inverted from each other. This permits a user to use a common prism edge against a paper or suitable drawing surface with the desired scale against the surface. A reference mark on the surface from one of the scales can easily be interrelated to other scales by turning the prism over to show those scales.

DESCRIPTION OF THE PRIOR ART

Patented devices for teaching the concepts and use of fractions are well known. For example, in U.S. Pat. No. 356,167 to Shannon sets of cards or blocks with color coded numbers for each set representing different values are used. A card or block representing unity is proportionally divided by the different fractional values.

In the Pannenkowa reference (U.S. Pat. No. 1,098,330) the understanding of numerators and denominators used in fractions plus the principles of their simplification is disclosed using sliding plates mounted between parallel battens in a frame.

The Coleman reference (U.S. Pat. No. 1,174,689) describes a series of card supporting horizontally disposed wires with a series of similarly disposed staggered rods.

An easel support jumbo ruler is used in the Struna (U.S. Pat. No. 2,803,069) invention and is made up of different movable block units representing different fractions.

The McMeen patent (U.S. Pat. No. 3,204,344) discloses a wheel and stick wherein number to be divided is represented by the stick and the fraction by which it is divided is represented by a wheel.

The Marsh et al represents (U.S. Pat. No. 3,781,114) describes an angular position indicating system of a continuously rotating member with a counter and wherein the ratio of the instantaneous count of the counter to a total count is equal to the ratio of the angular position of a stepping motor to 360 degrees.

Maurer's invention (U.S. Pat. No. 4,614,042) discloses a ruler is divided by subdivisions having both visual indicia and tactile features.

Marans's invention (U.S. Pat. No. 4,778,390) different fractional scales with a defined space or gap between the scales permits the insertion of a a piece of paper.

In the Sher invention (U.S. Pat. No. 5,470,234) a circular piece matching math educational aid is disclosed. The present invention provided for a triangular shaped prism having different scaled fractions appearing in groups of two aligned number sets of two different scales on one side of each of the triangle's three faces all as more further set forth in this specification.

SUMMARY OF THE INVENTION

This invention relates to an educational apparatus to teach and learn the concept of mathematical operations using fractions. A triangular prism with different number scales thereon is employed in this educational tool.

It is the primary object of the present invention to provide for an improved apparatus to teach and learn fractions, mixed numbers and decimals.

Another object is to provide for such an apparatus utilizing a one piece tool resembling a ruler.

These and other objects and advantages of the present invention will become apparent to readers from a consideration of the ensuing description and the accompanying drawings.

DESCRIPTION OF THE PREFERRED EMBODIMENT

Figure 1:
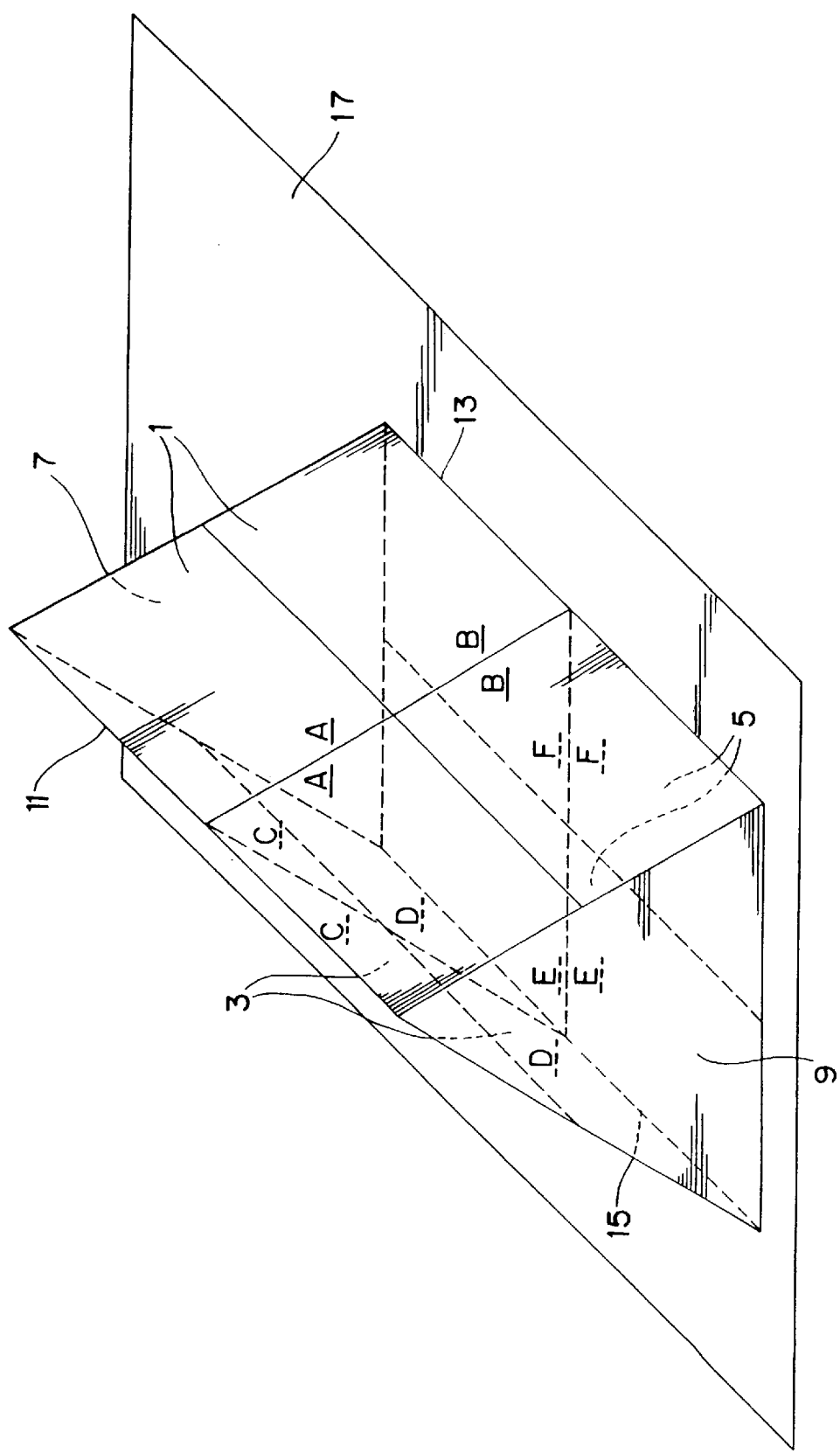
FIG. 1 is a front perspective view of the invention's preferred embodiment.

FIG. 1 is a front perspective view of the invention's preferred embodiment. In this embodiment the specific twelve different measuring scales on the exposed three flat facing sides of the ruler have been omitted. Essentially the ruler consists of a triangular prism having three equal flat exposed sides 1, 3 and 5 joined in a triangular configuration with two joined end upright isoceles triangles 7 and 9. Thus, in general overall appearance the ruler's outward form resembles an engineering ruler or an architect's ruler.

Each of the flat exposed facing sides (1, 3 and 5) have four different number measuring scales on their surfaces or imprinted into their surfaces such that a user may visually observe each scale on them. For example, on side 1 there are two upper adjacent and aligned measuring scales A and two different adjacent and aligned lower measuring scales B. The ruler's three straight corner edges (11,13 and 15) formed by the joining three facing side surfaces (1, 3 and 5) define straight edge lines that can be used in conjunction with a writing instrument to mark on a writing surface, such as the paper sheet defined by the dotted lines 17, which lies under the facing surface 5.

In FIG. 1 the triangular prism ruler has three flat facing surface sides each of which surfaces has four different measuring scales. For example, the sides for the ruler could have scales for a drawn whole unit, a halves unit, a thirds unit, a fourths unit, a fifths unit, a sixths unit, a sevenths unit, an eighths unit, a ninths unit, a tenths unit, an elevenths unit, and a twelfths unit. Each of the four different measuring scales on each of the three flat facing surface sides are grouped in two adjacent and straight line aligned measuring scales, such as those grouped on scales A and B. When one of the scales A or B has its associated adjacent straight edge (e.g., straight marking edge 13 associated with fractional group B) placed on a writing surface, the numbers of scale group B will appear upright while the numbers on the scale group A on the same surface side 1 will be inverted. This same viewing inversion applies to each of the different scale double groupings on each of the three different flat side surfaces (1, 3 and 5).

In order to have two adjacent and aligned straight line scales associated with a given edge of the ruler the side edges (11,13 and 15) are at least double the unit of measuring used. Thus, in our preferred embodiment the same three prism edges were each two decimeters (20 centimeters) in total length permitting two adjacent fractional measuring scales (one group) based on the one unit length, here 10 centimeters, with each of the individual fractional measuring scales being one decimeter (10 centimeters) in individual fractional measuring scale length. It is critical that one of the scales be the whole unit on which the other different fractional measuring scales are based whether set forth in fractional parts or decimal parts of the same whole unit set forth on the prism.

Figure 2:
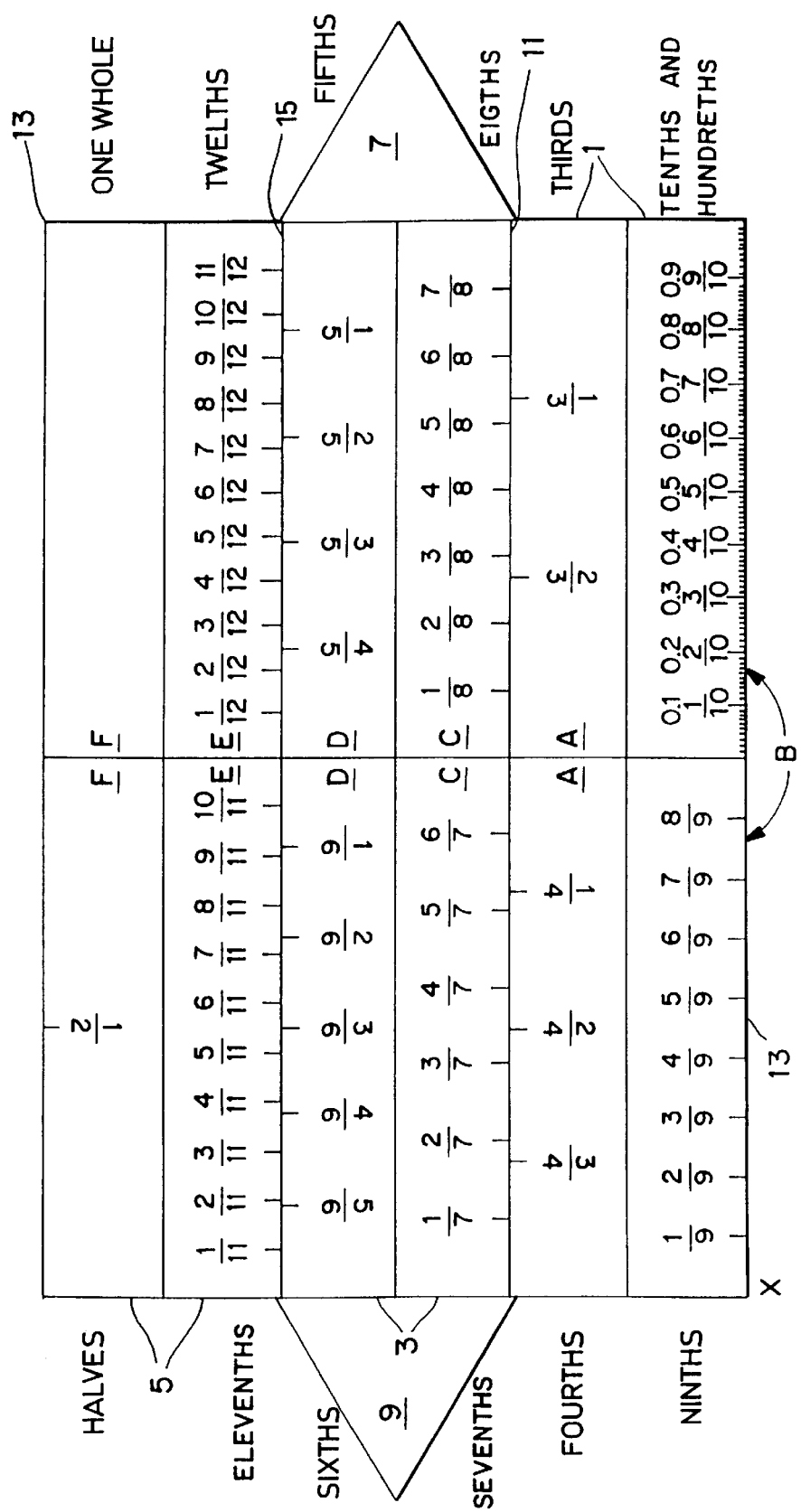
FIG. 2 is a top view of the FIG. 1 embodiment when flattened out and spread out to show all of the different scales on the three flat exposed faces.

FIG. 2 is a top view of the FIG. 1 embodiment when flattened out and spread out to show all of the different scales listed for the three flat faces. This second figure is only an illustrative figure used to show in one figure the twelve different scales that can be used on the three different surface sides of the FIG. 1 ruler. Thus, the straight edge 13 defined by the edge joining the two flat surface sides 1 and 5 appears at both the top and bottom of this flattened out and cut apart schematic representation. Thus one side 1 in scale group B, the ninths and tenths and hundredths edge measuring scales would engage the writing surface 17 in FIG. 1 and be visible to a user when the ruler's surface 5 is placed down on the writing surface.

The letters C and D have been used to indicate the two different double grouped scales on flat surface side 3 and the letters E and F have been used for the double grouping of different scales on side surface 5. These same four letters are also shown in dotted line format in FIG. 1 to show their respective placement on the flat facing surface sides of the ruler with two letters appearing on each of the three flat exposed surface sides (1,3 and 5).

The triangular shaped prism ruler thus has four identical length units measured with four different scales on each of its three surface sides making a total of twelve different measuring scales on the rule one of which is the whole unit scale. Each numerical value for a scale is different from the other but each measures the same whole unit and has the same total length. The decimeter (10 centimeters) was arbitrarily chosen as the length of the whole unit scale since fractions and especially decimal scales employing metric measures are compatible with this metric unit. Clearly other fractional values for the scales and other whole units could also be used as the base to construct the different measuring scales for the ruler.

In order to use the preferred embodiment ruler for "drawing a fraction", the ruler's edge with the visible desired scale is placed on a writing surface. A reference mark is made at the left end of the desired scale as designated by the reference numeral X in FIG. 2 and other reference mark or marks at the desired fraction indicia. These reference marks may be connected with a line segment if desired by using the straight edge 13 of the ruler.

This procedure for drawing a fraction may be used to assist in the comparison of fractions. Different lines are drawn, using the one of the ruler's straight edges, representing two or more fractions, with their left line ends aligned. The lengths of these drawn lines are then compared with the longest line representing the greater fractional value.

The procedure for drawing a fraction may also be used to add fractions. One fractional length is drawn. Then the fractional length to be added is also drawn and its left reference mark is aligned with the right reference mark of the first drawn fractional length. The total length of resultant fractions measured may then be compared or measured against an appropriate known reference scale length. This process of adding fractions is similar to the addition of whole numbers with a number line.

The procedure for drawing a fraction may also be used to subtract fractions. One fractional line is drawn. Then the fractional line to be subtracted from the first drawn line is drawn and its right reference mark is aligned with the right reference mark of the first drawn fractional line. The length between the left reference marks of the two fractions may be used with an appropriate known reference scale to find the difference between the two fractional lengths. The process is similar to the subtraction of whole numbers with a number line.

The comparison, addition, and subtraction of mixed numbers may be accomplished using a procedure similar to the procedure for operations of fractions. The wholes in the mixed number may be measured and drawn by making a reference mark at the left end of the whole number scale (group F of surface side 5 in FIG. 2) and another reference mark at the right end of the whole scale. It could also be measured by using the equivalent of the whole number scale, such as three thirds, four fourths, etc. The next whole is drawn with its left reference mark aligned with the right reference mark of the first whole. This is repeated as needed to draw the appropriate number of whole unit lengths needed. The fractional part of the mixed number is then drawn with its left reference mark aligned with the right reference mark of the last whole to create the desired mixed number total length.

Multiplication of fractions may also be accomplished by drawing a "unit square", one whole unit wide by one whole unit high. The square may then be divided horizontally into fractional parts by aligning the left edge as designated by the reference number X of the appropriate scale along the left side of the unit square and making reference marks for each of the fraction indicia on that scale. This is repeated on the right side of the unit square.

The reference marks drawn on the left and right sides of the unit square may be connected with lines using one of the ruler's three edges (11,13 or 15). This procedure may be repeated to create vertical lines with any appropriate scale by aligning the ruler with the top edge and bottom edge of the unit square. The appropriate number of vertical and horizontal sections may be shaded to represent the fraction of the unit square desired. The number of twice shaded section over the number of sections the unit square has been divided into represents the product of the two fractions.

The division of fractions may be done by drawing, dividing and shading a unit square using the same procedure as for multiplying fractions. The number of sections has dividing the first shaded part of the unit square over the number of sections now dividing the second shaded part of the unit square represents the quotient of the two fractions.

Multiplication and division with mixed numbers may be done using a procedure similar to that for fractions by drawing the whole unit squares to represent the whole number part of the mixed number as well as drawing and shading the fractional part of the mixed number.

All of the operations may be done with decimals to the hundredths place. The decimal equivalents of the fractions on the tenths scale are shown above the tenths scale (side 1, group B, right scale in FIG. 2).

The triangular prism ruler may be made of a wide variety of materials using different manufacturing methods. Extruded or molded plastic, wood or even paper could be used for the ruler's material. The plastic extrusion process is one example of a type of manufacturing process that can be used.

Conceivably the triangular prism with its twelve different fractional measuring scales could be replaced by a square prism with sixteen different measuring scales located adjacent the joining surface cube edges. The specific scales used could also be changed from those illustrated in FIG. 2. For example, the sevenths and elevenths scales could be dropped and a sixteenths and fifteenths scale added. The decimeter length of the ruler could also be changed to any length and then conveniently be divided by fractions.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. An educational apparatus used for the teaching of mathematical operations using fractions comprising:

a prism having at least three side surfaces substantially identical in surface area that are joined together at common edges and have two connecting joined backs, one of which is located at each end of the joined surfaces to form a solid prism; and each of said different prism side surfaces having a plurality of fractional measuring scales of the same length and different fractional numerical values thereon, at least one of the measuring scales representing the whole unit whose fractional values are stated on the other different measuring scales, each of said measuring scales being adjacent to one of the common joined prism edges, wherein there are four of said different fractional measuring scales on each surface side with two of said side scales being aligned and adjacent with each other and inverted from the two other fractional measuring scales on the same surface.

2. The apparatus as claimed in claim 1, wherein the stated numerical values of the different fractional measuring scales include half units, thirds of a unit and fourth of a unit measuring scales based on the whole unit measuring scale.

3. The apparatus as claimed in claim 2, wherein there are twelve of said different numerical value fractional measuring scales on all of the prism's three side surfaces including a tenths of a unit measuring scale.

4. An educational apparatus used for the teaching of mathematical operations using fractions comprising:

a prism having three side surfaces that are joined together at common edges, said three prism sides being substantially identical in surface area and having two connecting joined triangular shaped backs one of which is located at each end of the three joined surface sides to form a solid triangular prism; and each of said different prism side surfaces having four different fractional measuring scales of the same length and different fractional numerical values thereon, at least one of the measuring scales representing the whole unit whose fractional values are stated on the other different measuring scales, each of said measuring scales being adjacent to one of the common joined prism edges, with two of the measuring scales being aligned and adjacent to each other and inverted from the two other fractional measuring scales on the same surface side.

5. The apparatus as claimed in claim 4, wherein the stated numerical values of the different measuring scales include half-units, thirds of a unit, and fourth of a unit measuring scales based on the whole unit measuring scale.

6. The apparatus as claimed in claim 5, wherein there are twelve of said different numerical value fractional measuring scales on all of the prism's three side surfaces including a tenths of a unit measuring scale.

7. An educational apparatus used for the teaching of mathematical operations using fractions comprising:

a prism having three side surfaces that are joined together at common edges, and each of said different prism side surfaces having four different fractional measuring scales of the same length and different fractional numerical values thereon, at least one of the measuring scales representing the whole unit whose fractional values are stated on the other different measuring scales, each of said measuring scales being adjacent to one of the common joined prism edges, with two of the side scales being aligned and adjacent to each other and inverted from the two other fractional measuring scales on the same surface side.

* * * * *